(12) United States Patent
Dusterhoft et al.

(10) Patent No.: US 12,534,980 B2
(45) Date of Patent: Jan. 27, 2026

(54) HYBRID HYDROGEN POWER GENERATION FOR POWERING OILFIELD EQUIPMENT

(71) Applicant: Halliburton Energy Services, Inc., Houston, TX (US)

(72) Inventors: Ronald Glen Dusterhoft, Houston, TX (US); Philip D. Nguyen, Houston, TX (US); Stanley Vernon Stephenson, Duncan, OK (US); Adam Lynn Marks, Duncan, OK (US)

(73) Assignee: Halliburton Energy Services, Inc., Houston, TX (US)

( * ) Notice: Subject to any disclaimer, the term of this patent is extended or adjusted under 35 U.S.C. 154(b) by 0 days.

(21) Appl. No.: 18/591,830

(22) Filed: Feb. 29, 2024

(65) Prior Publication Data

US 2025/0277430 A1    Sep. 4, 2025

(51) Int. Cl.
*E21B 41/00* (2006.01)
*C01B 3/24* (2006.01)
*H01M 8/0612* (2016.01)
*H01M 8/12* (2016.01)

(52) U.S. Cl.
CPC ........... *E21B 41/0085* (2013.01); *C01B 3/24* (2013.01); *H01M 8/0631* (2013.01); *H01M 8/12* (2013.01); *C01B 2203/1241* (2013.01); *H01M 2008/1293* (2013.01); *H01M 2300/0074* (2013.01)

(58) Field of Classification Search
CPC .............. E21B 41/0085; C01B 3/24; C01B 2203/1241; H01M 8/0631; H01M 8/12; H01M 2008/1239

USPC ......................................................... 166/248
See application file for complete search history.

(56) References Cited

U.S. PATENT DOCUMENTS

| | | |
|---|---|---|
| 4,250,230 A * | 2/1981 | Terry .................... E21B 43/40 |
| | | 166/266 |
| 7,037,485 B1 | 5/2006 | Drnevich et al. |
| 7,578,922 B2 | 8/2009 | Nakagiri |
| 7,709,113 B2 | 5/2010 | Logan et al. |
| 7,938,879 B2 | 5/2011 | Woodall et al. |
| 8,075,869 B2 | 12/2011 | Zhu et al. |
| 8,138,380 B2 | 3/2012 | Olah et al. |
| 8,469,009 B2 | 6/2013 | Munshi et al. |
| 10,577,910 B2 | 3/2020 | Stephenson |
| 11,548,782 B1 | 1/2023 | Nguyen et al. |
| 11,746,635 B1 * | 9/2023 | Kabrich ................. F04B 17/03 |
| | | 417/10 |
| 12,113,254 B1 * | 10/2024 | Nguyen ............ H01M 8/04007 |
| 2003/0116321 A1 * | 6/2003 | Zhang .................. H01M 8/243 |
| | | 166/65.1 |

(Continued)

*Primary Examiner* — Nicole Coy
*Assistant Examiner* — Douglas S Wood
(74) *Attorney, Agent, or Firm* — John Wustenberg; C. Tumey Law Group PLLC

(57) ABSTRACT

Provided are methods and systems to generate power from hydrogen in a hybrid hydrogen power generation system including two or more different hydrogen power generation systems. In some examples, electricity may be generated to power oilfield equipment by hydrogen fuel cells and/or by solid oxide fuel cells. Electricity may also be generated to recharge an energy storage for future electricity use. Hydrogen may also be injected directly into an internal combustion engine powering oilfield equipment such as a turbine and/or a reciprocating engine to lower hydrocarbon-based fuel consumption.

1 Claim, 3 Drawing Sheets

(56) References Cited

U.S. PATENT DOCUMENTS

| | | | |
|---|---|---|---|
| 2004/0265223 A1* | 12/2004 | Etievant | B01J 19/0026 422/198 |
| 2005/0089464 A1* | 4/2005 | Wang | C01B 32/40 423/418.2 |
| 2008/0128134 A1* | 6/2008 | Mudunuri | E21B 43/30 166/302 |
| 2013/0323614 A1* | 12/2013 | Chapman | C01B 3/12 422/139 |
| 2017/0047598 A1* | 2/2017 | Andrzejak | E21B 43/2401 |
| 2023/0241549 A1* | 8/2023 | Arkadakskiy | B01D 53/18 166/402 |
| 2025/0101835 A1* | 3/2025 | Dusterhoft | C25B 15/081 |

* cited by examiner

HYBRID HYDROGEN POWER GENERATION FOR POWERING OILFIELD EQUIPMENT

BACKGROUND

During the drilling and completion of oil and gas wells, various wellbore treatments are performed on the wells for a number of purposes. For example, hydrocarbon-producing wells are often stimulated by hydraulic fracturing operations, wherein a servicing fluid such as a fracturing fluid may be introduced into a portion of a subterranean formation penetrated by a wellbore at a hydraulic pressure sufficient to create or enhance fractures therein. Such a fracturing treatment may increase hydrocarbon production from the well.

At a well stimulation site, there are typically several large pieces of fracturing (or other well stimulation) equipment on location that must be powered including, but not limited to, a gel mixer, liquid handling equipment, sand handling equipment, a blender, a plurality of high-pressure hydraulic pumping units, and a control center. The equipment on location is used to deliver large quantities of fluid/proppant mixtures to a wellhead at high-pressures to perform the desired operations. Often, the hydraulic pumping units and other machinery on location are powered by internal combustion engines such as diesel-cycle internal combustion engines. In general, these diesel engines operate at relatively low efficiencies (e.g., approximately 32%). The stimulation site will often include several individual diesel-powered units (e.g., pumping units, blenders, etc.) that must be refueled multiple times a day throughout a multi-stage stimulation operation.

BRIEF DESCRIPTION OF THE DRAWINGS

These drawings illustrate certain aspects of some of the embodiments of the present disclosure and should not be used to limit or define the disclosure.

DETAILED DESCRIPTION

Figure 1:
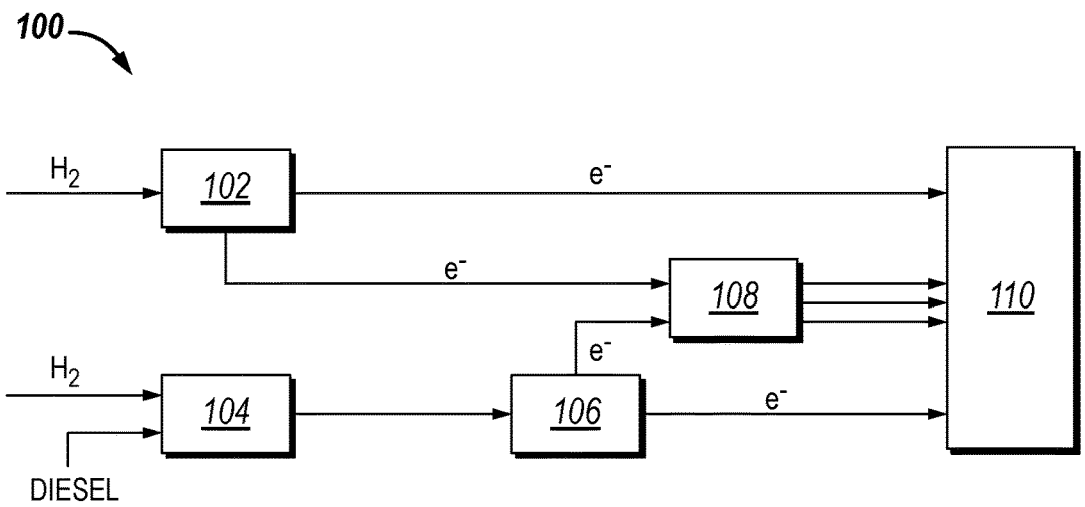
FIG. 1 is a schematic of a system 100 according to some embodiments of the present disclosure.

Disclosed herein are examples of methods and systems to generate power from hydrogen in a hybrid hydrogen power generation system including two or more different hydrogen power generation systems. In some embodiments, electricity may be generated to power oilfield equipment by hydrogen fuel cells and/or by solid oxide fuel cells. In some embodiments, electricity may be generated to recharge an energy storage for future electricity use. In some embodiments, hydrogen may be injected directly into an internal combustion engine powering oilfield equipment such as a turbine and/or a reciprocating engine to lower hydrocarbon-based fuel consumption. The internal combustion may be any internal combustion including two-strokes spark ignition gasoline engine, four-stroke spark ignition gasoline engine, compression ignition diesel engine, and any combination thereof. Hydrogen may be blended with any hydrocarbon-based fuel powering the internal combustion engine including diesel, gasoline, methane, natural gas, ethanol, biodiesel, and any combination thereof to lower the hydrocarbon-based fuel. For example, hydrogen is blended with methane or natural gas and injected into the diesel-cycle internal combustion engine system to lower diesel consumption. Therefore, it is possible to have different power generation systems providing power on any given oilfield location creating a hybrid power generation system, for example, to lower hydrocarbon-based fuel consumption and emissions of carbon dioxide, nitrogen oxide, particulate matter, and/or unburned hydrocarbons.

Hydrogen, methane, natural gas, propane, and any blends thereof may be cleaner burning fuels than diesel fuel. Therefore, replacing part of the diesel by at least one of these cleaner burning fuels or by any combination of these cleaner burning fuels should lower emissions of carbon dioxide, nitrogen oxide, particulate matter, and/or unburned hydrocarbons.

Hydrogen is seen as one of the most promising energy vectors to replace diesel fuel. Hydrogen can be used to directly drive equipment, such as by combustion of the hydrogen, or may be used in a fuel cell to generate electricity which may then be used to power equipment. Many efforts are being made to produce hydrogen without any carbon dioxide ($CO_2$) emission via water electrolysis powered by renewable energy, for instance. Renewable energy sources include geothermal energy, solar energy, wind energy, hydroelectric energy, ocean wave energy, or nuclear energy, for example. Another method to produce hydrogen is conventional coal gasification and steam methane reforming processes; however, these techniques are undesirable due to carbon dioxide emissions. Thermal decomposition of methane produces hydrogen and solid carbon, and thus, the release of greenhouse gases is prevented.

While the hydrogen used in example methods and systems disclosed herein may be from any suitable source, methane pyrolysis may be used to provide hydrogen in accordance with some embodiments. Methane pyrolysis includes heating methane under conditions to thermally crack methane into molecular hydrogen gas and solid carbon where the overall reaction is shown by Reaction 1.

Reaction 1

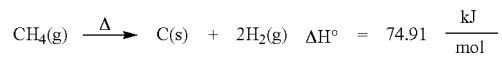

$$CH_4(g) \xrightarrow{\Delta} C(s) + 2H_2(g) \quad \Delta H° = 74.91 \ \frac{kJ}{mol}$$

Thermal cracking may occur at temperature around 1100° C. or more, or 1200° C. or more in a non-catalytic process as methane is a very stable molecule due to the strong C—H bonds and the symmetry of its molecular structure. However, the incorporation of a catalyst can significantly reduce the reaction temperature depending upon its nature. The catalyst includes any catalyst capable of lowering the activation energy of the reaction including metal and non-metal catalysts. Conventional metal catalysts include nickel, cobalt, and iron, for example. Iron catalyst can lower the reaction temperatures to 700° C. for a certain period of time, for instance. A metal promoter may be incorporated to extend the lifetime of metal catalysts. Metal promoters include palladium and copper, for example. Carbon catalyst is a good example of a non-metal catalyst due to their high catalytic activity and high stability. Molten metals (titanium, lead, or tin), molten metal alloys (nickel-bismuth, copper-bismuth), and molten salts (potassium bromide, sodium bromide, sodium chloride, sodium fluoride, manganese (II) chloride, potassium chloride) can be alternative catalyst, but their thermal stability above 1000° C. can be a challenge. Methane pyrolysis is also affected by the reaction pressure, the reaction time, the reactor type, and the temperature ramping rate.

Methane pyrolysis typically may occur in the absence of oxygen where multiple endothermic reactions split C—H bonds to form carbon nanoparticles ($C_{(s)}$) and molecular hydrogen gas ($H_2(g)$). In embodiments, the methane pyrolysis is performed in a microwave pyrolysis unit configured to perform microwave plasma pyrolysis and/or microwave-assisted pyrolysis. In embodiments, the microwave pyrolysis unit comprises a plasma chamber, a microwave-feeding resonator with a microwave generator for forming the plasma and coupling points in the metal wall between the resonator and plasma chamber for coupling the microwave into the plasma chamber. In embodiments, an inlet stream containing methane is introduced into the plasma chamber and exposed to microwave plasma with a sufficient power density to cause at least a portion of the methane from the inlet stream to decompose to form hydrogen and carbon nanoparticles. In further embodiments, the methane pyrolysis is performed in a plasma microwave pyrolysis unit comprising a reaction chamber positioned within an opening of a waveguide and a microwave generator configured to generate microwaves and feed the microwaves into the waveguide. In embodiments, an inlet stream containing methane is introduced into the reaction chamber and microwave energy is propagated through the waveguide into the reaction tube at a sufficient power density to cause at least a portion of the methane from the inlet stream to decompose to form hydrogen and carbon nanoparticles.

An inlet stream to the microwave pyrolysis unit includes methane. The inlet stream may include pure methane or methane mixed with other hydrocarbons such as ethane, propane, butane, hexane, and heteroatom containing hydrocarbon species. For example, the inlet stream may include pipeline quality natural gas containing 92 wt. % to 98 wt. % methane with the balance being natural gas liquids and impurities. Methane gas ($CH_4$) can be released from wellheads as well as from various production equipment such gas/liquid separators, oil/water separators, and other surface production equipment. Production storage tanks are used to hold produced liquids including crude oil, water, and gas condensate for periods before pipelining or other transportation of produced liquids. Crude oil and condensate may experience evaporation from temperature increases and pressure drops while in the storage tanks which cause gases dissolved in the liquid to flash out of the liquid phase to form a vapor phase which is rich in methane. The vapor phase may be captured and directed to microwave pyrolysis units described herein. Membrane separators, and/or metal organic frameworks, can be used to separate and purify methane from other gas components at the wellsite before capture. In some embodiments, the methane gas may include waste gas that is typically flared such as during the production and pipelining of hydrocarbons. In some embodiments, methane gas from a wellhead may be supplemented with additional methane fuel delivered to the location. Additional examples of suitable methane sources include captured methane from the wellhead, captured methane from landfills, captured methane from cattle and dairy farms, or captured methane from steam methane reforming. In further embodiments, the methane is included in a hydrocarbon mixture with other hydrocarbons, water, and/or sulfur containing compounds, for example. In embodiment, the feed to a decomposition reactor includes a Y-Grade hydrocarbon which may include hydrocarbons such as ethane, propane, butane, hexane. Y-grade is a natural gas liquid mixture that has been through field processing but has not been fractionated. Y-grade hydrocarbons are typically separated from natural gas before pipelining the natural gas product. In some examples, the inlet stream to the microwave pyrolysis unit includes produced methane, captured methane, or both.

Produced methane, such as from wellheads and gas/liquid separators may be distinguished from pipeline quality natural gas as the produced methane is present in a more dilute mixture with other hydrocarbons such as $C_2$-$C_6$ hydrocarbons as well as water, hydrogen sulfide, carbon dioxide, and nitrogen, for example. Specifications for pipeline quality natural gas can vary by pipeline carrier but typically includes specification for heating value and minimum content of methane of at least 75 wt. % as well as a maximum total sulfur content (mercaptan and hydrogen sulfide) of 20 ppm per 100 standard cubic feet. In embodiments, the inlet stream to the microwave pyrolysis unit includes produced methane wherein the inlet stream comprises methane in an amount of about 10 wt. % to about 75 wt. % with the balance being at least one of $C_2$-$C_6$ hydrocarbons as well as water, mercaptan, hydrogen sulfide, carbon dioxide, and nitrogen.

A product stream from the microwave pyrolysis unit includes hydrogen gas and carbon nanoparticles. The product stream may further include pyrolysis products from the pyrolysis of other components in the inlet stream such as $C_2$-$C_6$ hydrocarbons as well as unreacted hydrocarbons and/or hydrogen sulfide, nitrogen, carbon dioxide, and water.

Generally, the term "nanoparticle" may be defined as a particle having a Dv50 particle size of less than 1 micron, for example; about 1 nanometer ("nm") to about 950 nm, such as about 5 nm, about 10 nm, about 20 nm, about 30 nm, about 40 nm, about 50 nm, about 60 nm, about 70 nm, about 80 nm, or about 90 nm, about 100 nm, about 500 nm, about 750 nm, about 950 nm, or any ranges therebetween. The Dv50 particle size may also be referred to as the median particle size by volume of a particulate material. The Dv50 particle size is defined as the maximum particle diameter below which 50% of the material volume exists. The Dv50 particle size values for a particular sample may be measured by commercially available particle size analyzers such as those manufactured by Malvern Instruments, Worcestershire, United Kingdom. The carbon nanoparticles can include single wall carbon nanotubes, multi wall carbon nanotubes, fullerenes, graphene, and combinations thereof. Particulate, particle, and derivatives thereof as used in this disclosure, include, all known shapes of materials, including substantially spherical materials, low to high aspect ratio materials, fibrous materials, polygonal materials (such as cubic materials), and mixtures thereof. In embodiments, the carbon nanoparticles produced in the microwave pyrolysis unit may be discrete particles or may be agglomerations of small particles.

In embodiments, the product stream from the microwave pyrolysis unit is introduced into a separation unit which separates components of the product stream. The separation unit may be configured to separate the product stream into a gas stream containing the hydrogen and other gasses present in the product stream, and a solid product containing the carbon nanoparticles. In embodiments, the separation unit includes structures and equipment capable of separating the carbon nanoparticles from the bulk gas of the product stream from the microwave pyrolysis unit. Separation units may include inertial separators such as rotary flow dust separators, cyclones, and co-current centrifugal separators, a baghouse filter system, and/or electrostatic separators. In some examples, the gas stream includes hydrogen in an amount of greater than 50 mol. %, or greater than 75 mol. %, or greater than 90 mol. %, for example. In further examples, the gas stream includes greater than 50 mol. % of the hydrogen from the product stream from the microwave pyrolysis unit, or greater than 75 mol. % of the hydrogen, or greater than 90 mol. % of the hydrogen. In further examples, the solid products contain greater than 50 mol. % of carbon nanoparticles from the product stream from the microwave pyrolysis unit, greater than 75 mol. % of the carbon nanoparticles, greater than 90 mol. % of the carbon nanoparticles, greater than 95 mol. % of the carbon nanoparticles, or greater than 99 mol. % of the carbon nanoparticles.

In embodiments, the production of hydrogen is not steady state. For example, the amount of hydrogen needed to power wellbore equipment downstream of the microwave pyrolysis unit may vary and therefore the mass of methane pyrolyzed, and mass of carbon nanoparticles produced, may vary with time. Additionally, the separator itself may output unsteadily as plug flow, for example. In embodiments, an optional second separator may be utilized to provide a steady state flow to a downstream blending unit. In embodiments, the second separator includes a steady flow separator, for example.

In some embodiments, separation is performed using two or more separation units wherein the solid product is transported from the first separation unit to the second separation unit or from one separation unit to the following separation unit flowing an additional gas such as nitrogen or inert gasses such as helium, neon, argon, krypton, xenon, or radon. In embodiments, at least part of the additional gas is removed before a blending unit.

Microwave methane pyrolysis offers several advantages including more efficient energy transfer, faster reaction rates, and selective heating. Modern microwave methane pyrolysis can operate at over 90% of conversion efficiencies of electricity into thermal energy. Conventional catalysts may be used to help lower the operating temperatures and improve the yield of hydrogen products. Conventional catalysts include metals such as nickel, iron, or cobalt, for example, metal oxides, zeolites, or any combination thereof. However, the solid carbon product of the reaction can be used as catalyst increasing the reaction rate of the microwave methane pyrolysis and improving its energy efficiency. The produced solid carbons used as catalysts are more stable and exhibit longer lifetimes than traditional metal catalysts. Therefore, the use of the produced solid carbons as catalysts is financially advantageous.

The molecular hydrogen gas generated from methane decomposition may be supplied to a fuel cell for generation of electricity in accordance with one or more embodiments. The fuel cells may be stationary or mobile. The electricity generated by the fuel cells may be used for any suitable purpose. In some embodiments, the fuel cells may be used to power well equipment, such as fracturing equipment at a well stimulation site. The fuel cells may be coupled to the well equipment via a DC/AC converter and, in some embodiments, via a variable frequency drive (VFD). The fuel cells may be arranged in a fuel cell stack that is used to generate electricity to power various electrical devices (e.g., electric motors) on the well equipment. For example, the fuel cells may be coupled to electric motors on pumping units and used to drive hydraulic pumps on the pumping units, thereby pumping fracturing fluid to a wellhead at a desired pressure. The hydraulic pumping units may include one or more reciprocating pumps, centrifugal pumps, vane pumps, or other types of pumps. Fuel cells may be used to power other equipment on location as well, including a blender unit, a gel/ADP mixer unit, sand handling equipment, liquid handling equipment, a control center (e.g., tech center), and others. Well equipment may be driven partially or entirely by electrical power generated using the fuel cells, as opposed to diesel engines that are conventionally used on location.

In embodiments, the hydrogen fuel cells generate electricity to charge an energy storage device that can provide electricity for future use. The energy storage device may provide electricity to power oilfield equipment such as electric drive and mechanical drive, for example. The energy storage device may be any device that can store energy including batteries and supercapacitors. In some embodiments, the energy storage device can be used in conjunction with one or more fuel cells and one or more internal combustion engines to provide complementary electrical power to oilfield equipment to minimize fossil fuel consumption. The energy storage device can store energy from a fuel cell, an electrical generator, the electrical grid, an electricity generator powered by an internal combustion engine, and any combination thereof. In some embodiments, the produced molecular hydrogen gas may be stored in a hydrogen storage as a metal hydride in a container or in a hydrogen well storage, which is a completed well dedicated to hydrogen storage. The stored hydrogen may be fed to a hydrogen fuel cell when electricity is needed to power oilfield equipment and/or recharge the energy storage. The stored hydrogen may need to be purified before being fed into hydrogen fuel cell.

However, solid oxide fuel cells can handle methane blended with hydrogen. Therefore, solid oxide fuel cells may be used instead of hydrogen fuel cells as solid oxide fuel cells do not need any purification of hydrogen. Solid oxide fuel cells may be any electrochemical conversion device that produces electricity directly from oxidizing a fuel using a solid oxide as electrolyte. One of the advantages of solid oxide fuel cells is their fuel flexibility allowing them to run on multiple fuels such as hydrogen, natural gas, biogas, methanol, ammonia, e-fuels, for example. One of the disadvantages of solid oxide fuel cells is their high operating temperature which can be remedy by using waste heat unit to recover the wasted heat to heat the inlet of the fuel cells or of any part of the operating system which runs at a lower temperature. Solid oxide fuel cells may be used in parallel with hydrogen fuel cells, for example.

In embodiments, the molecular hydrogen gas may be injected directly into an internal combustion engine powering oilfield equipment such as a turbine and/or a reciprocating engine to lower hydrocarbon-based fuel consumption. The internal combustion may be any internal combustion including two-strokes spark ignition gasoline engine, four-stroke spark ignition gasoline engine, compression ignition diesel engine, and any combination thereof. Hydrogen may be blended with any hydrocarbon-based fuel powering the internal combustion engine including diesel, gasoline, methane, natural gas, ethanol, biodiesel, and any combination thereof to lower the hydrocarbon-based fuel. Therefore, it is possible to have different power generation systems providing power on any given oilfield location creating a hybrid power generation system, for example, to lower hydrocarbon-based fuel consumption and emissions of carbon dioxide, nitrogen oxide, particulate matter, and/or unburned hydrocarbons. For example, hydrogen may be injected into a diesel-cycle internal combustion engine powering oilfield equipment including a turbine and/or a reciprocating engine to lower diesel consumption and emissions of carbon dioxide, nitrogen oxide, particulate matter, and unburned hydrocarbons. The produced molecular hydrogen gas may be blended with methane, natural gas, diesel, and/or another fuel and injected directly into the diesel-cycle internal combustion engine system to lower diesel consumption and emissions of carbon dioxide, nitrogen oxide, particulate matter, and unburned hydrocarbons. Diesel may be separately fed into the diesel-cycle internal combustion engine powering oilfield equipment. The diesel-cycle internal combustion engine may power a generator powering an electric drive powering oilfield equipment and/or charging an energy storage. An atomizer may be utilized to spray or agitate any of the fuel or combination of fuels mentioned above to optimize mixing.

In embodiments, the system may be a microwave methane pyrolysis system. The microwave methane pyrolysis system includes a microwave reactor, a microwave generator, a microwave applicator, a waveguide, a temperature control system, a heat exchanger, a hydrogen separator, a particle separator, separation units, hydrogen and carbon collection systems, waste recovery units, and monitoring and control systems. The monitoring and control system ensures safe and efficient operation by measuring and regulating temperature, pressure, flow rates, and composition to maintain optimal process and safety conditions.

In embodiments, the microwave reactor may be made of materials transparent to microwaves including quartz or borosilicate glass. Further, the microwave reactor may be equipped with a waveguide system to deliver microwave energy into the reaction chamber. The microwave reactor includes a microwave generator to produce and deliver microwave energy into the reactor. For example, the microwave generator produces microwaves at a specific frequency, such as 2.45 GHz for example, that is absorbed by the methane molecules resulting in rapid heating. The microwave applicator ensures efficient energy transfer from the microwave source to the reactants. It can be in the form of a waveguide or a resonant cavity depending upon the design of the system. Microwaves selectively heat the methane molecules, inducing rapid and localized heating. The high-frequency oscillations of the microwaves preferentially heat polar molecules, such as methane, over non-polar species, facilitating the pyrolysis reaction. The heat energy breaks down methane into solid carbon and molecular hydrogen gas products.

The microwave reactor includes solid carbon products, which can be fluidized and function as catalysts. The microwave generator may generate microwave to heat the reactant, methane, and the products including the solid carbon products, which can function as catalyst, to high temperatures at over 90% of conversion efficiencies of electricity into thermal energy. Waste heat produced from the microwave reactor may be recovered using a waste recovery unit to preheat the feed, i.e., methane or natural gas, prior to its introduction into the microwave reactor. The produced molecular hydrogen gas may be fed directly into a hydrogen fuel cell to power oilfield equipment and/or recharge in an energy storage device for future electricity use and/or stored in a hydrogen storage. The energy storage device includes any storage capable of storing energy such as batteries and supercapacitors. The solid carbon products may also be utilized for other processes where the solid carbon products can be permanently sequestered.

In some embodiments, the power generation system may include two or more different power generation systems to power oilfield equipment. Hydrogen fuel cells may be combined with an internal combustion engine, for example. The internal combustion engine may be fueled by hydrogen and/or any hydrocarbon-based fuel including methane, natural gas, propane, and any blends thereof that may be cleaner burning fuels than diesel fuel. Any of these fuels may replace at least part of the diesel to lower emissions of carbon dioxide, nitrogen oxide, particulate matter, and/or unburned hydrocarbons. The hydrogen fuel cells may power an electric drive that power oilfield equipment such as well stimulation equipment, for example. The internal combustion engine may directly power the oilfield equipment. In some embodiments, the internal combustion engine powers an electric generator that powers oilfield equipment including well stimulation equipment. When the electricity produced by the power generation system is higher than the oilfield equipment needs, it may be stored in an energy storage as discussed above. When the electricity needed to power the oilfield equipment is higher than the electricity produced by the hydrogen fuel cells and/or the internal combustion engine, the energy storage may be used to provide the energy needed. The energy storage may be recharged by the hydrogen fuel cells, the internal combustion engine, the electric grid, or any combination thereof.

In some embodiments, solid-oxide fuel cells may be combined with an internal combustion engine to power oilfield equipment. Hydrogen, methane, natural gas, or any combination may be mixed in an atomizer before being introduced to the solid oxide fuel cells and/or the internal combustion engine. The internal combustion may be any internal combustion including two-strokes spark ignition gasoline engine, four-stroke spark ignition gasoline engine, compression ignition diesel engine, and any combination thereof. Hydrogen may be blended with any hydrocarbon-based fuel powering the internal combustion engine including diesel, gasoline, methane, natural gas, ethanol, biodiesel, and any combination thereof to lower the hydrocarbon-based fuel. For example, diesel may fuel the internal combustion engine. In some embodiments, the internal combustion engine may be fueled by diesel in combination with hydrogen, methane, natural gas, propane, and any blends thereof that may be cleaner burning fuels than diesel fuel. The solid oxide fuel cells may power an electric drive that power oilfield equipment including well stimulation equipment. The internal combustion engine may power the oilfield equipment directly. In some embodiments, the internal combustion engine powers an electric generator that powers the electric drive of the oilfield equipment including well stimulation equipment. When the electricity produced by the power generation system is higher than the oilfield equipment needs, it may be stored in an energy storage as discussed above. When the electricity needed to power the oilfield equipment is higher than the electricity produced by the hydrogen fuel cells and/or the internal combustion engine, the energy storage may be used to provide the energy needed. The energy storage may be recharged by the solid oxide fuel cells, the internal combustion engine, the electric grid, or any combination thereof.

In some embodiments, the solid oxide fuel cells are combined with hydrogen fuel cells to power oilfield equipment including well stimulation equipment. In some embodiments, the solid oxide fuel cells are combined with hydrogen fuel cells and internal combustion engine to power oilfield equipment including well stimulation equipment. In some embodiments, solid oxide fuel cells are combined with hydrogen fuel cells, internal combustion engine, and energy storage to power oilfield equipment including well stimulation equipment.

FIG. 1 is a schematic of a system 100 according to some embodiments of the present disclosure. The system 100 includes two or more power generation systems that use hydrogen, specifically hydrogen fuel cells 102 and internal combustion engine 104. As illustrated, hydrogen may be fed to hydrogen fuel cells 102 and an internal combustion engine 104. An additional fuel source may also be fed to internal combustion engine 104 with the hydrogen. Examples of suitable additional fuel sources include any hydrocarbon-based fuel such as diesel, methane, and natural gas, among others. In some embodiments, the additional fuel source may be combined with the hydrogen before being fed to the internal combustion engine 104, for example, in an atomizer. In some embodiments, internal combustion engine 104 may be a dual fuel engine, for example, that uses hydrogen and hydrocarbon-based fuel such as diesel, for example. Internal combustion engine 104 may power a generator 106 that provides electricity to an energy storage 108 and/or electric drive 110 that power well stimulation equipment.

Hydrogen fuel cells 102 may also provide electricity to energy storage 108 and/or electric drive 110 that power well stimulation equipment as well. Hydrogen fuel cells 102 may be stationary or mobile. Hydrogen fuel cells 102 may be arranged in a fuel cell stack that is used to generate electricity to power oilfield equipment. Oilfield equipment may include any oilfield equipment including any electric motors on pumping units and used to drive hydraulic pumps on the pumping units, thereby pumping fracturing fluid into a wellhead at a desired pressure. The hydraulic pumping units may include one or more reciprocating pumps, centrifugal pumps, vane pumps, or other types of pumps. Oilfield equipment further may include a blender unit, a gel/advanced dry polymer (ADP) handling equipment, sand handling equipment, liquid handling equipment, a control center (e.g., tech center), and others. In some embodiments, energy generated by hydrogen fuel cells 102 may be stored in energy storage 108, for example, when the demand from well stimulation equipment is lower than the amount of electricity produced by hydrogen fuel cells 102. Energy storage 108 may be any storage that can store energy including batteries and supercapacitors. When needed, electricity from energy storage 108 may be used to power electric drive 110 that drives oilfield equipment. For example, when the demand from oilfield equipment is higher than the amount of electricity produced by hydrogen fuel cells 102, electricity may be withdrawn from energy storage 108. Alternatively, energy storage 108 may be used in place of directly powering electric drive 110 with the electricity such that electricity from hydrogen fuel cells is first stored in energy storage 108 then supplied to electric drive 110.

Figure 2:
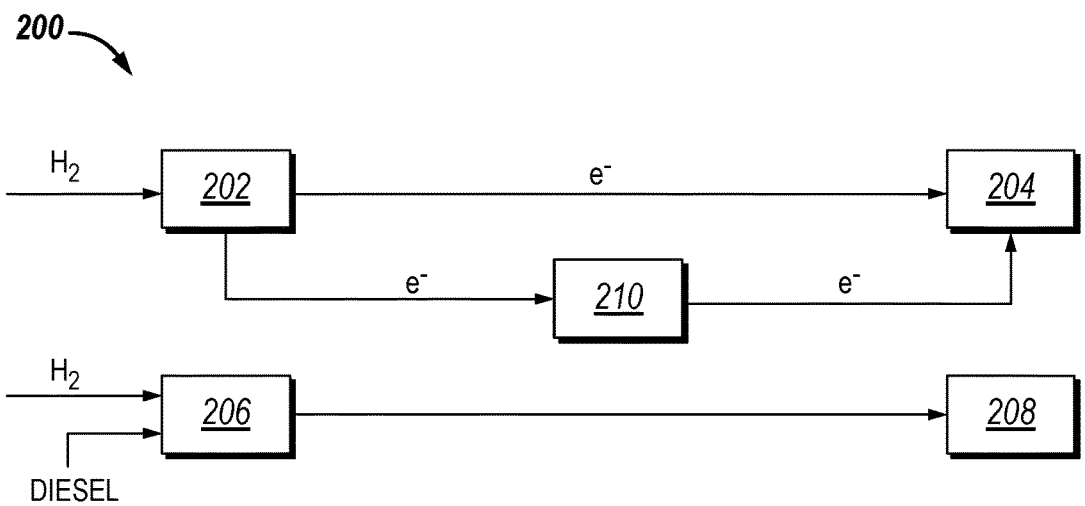
FIG. 2 is a schematic of a system 200 according to some embodiments of the present disclosure.

FIG. 2 is a schematic of a system 200 that includes two or more power systems that use hydrogen according to some embodiments of the present disclosure. Hydrogen is injected into hydrogen fuel cells 202 to power electric drive 204, and hydrogen may also be fed into internal combustion engine 206. The electricity generated by hydrogen fuel cells 202 may be used, for example, to power electric drive 204 that powers oilfield equipment, such as well stimulation equipment. In some embodiments, energy generated by hydrogen fuel cells 202 may be stored in energy storage 210, for example, when the demand from well stimulation equipment is lower than the amount of electricity produced by hydrogen fuel cells 202. Energy storage 210 may be any storage that can store energy including batteries and supercapacitors. When needed, electricity from energy storage 210 may be used to power electric drive 204 that drives oilfield equipment. For example, when the demand from oilfield equipment is higher than the amount of electricity produced by hydrogen fuel cells 202, electricity may be withdrawn from energy storage 210. Alternatively, energy storage 210 may be used in place of directly powering electric drive 204 with the electricity such that electricity from hydrogen fuel cells is first stored in energy storage 206 then supplied to electric drive 204.

As illustrated, hydrogen may be fed into internal combustion engine 206. An additional fuel source may also be fed to internal combustion engine 206 with the hydrogen. Examples of suitable additional fuel sources include hydrocarbon-based fuel such as diesel, methane, and natural gas, among others. In some embodiments, the additional fuel source may be combined with the hydrogen before being fed to internal combustion engine 206, for example, in an atomizer. In some embodiments, internal combustion engine 206 may be dual fuel engine, for example, that uses hydrogen and diesel. Internal combustion engine 206 may power a mechanical drive 208 that powers oilfield equipment, such as well stimulation equipment.

Figure 3:
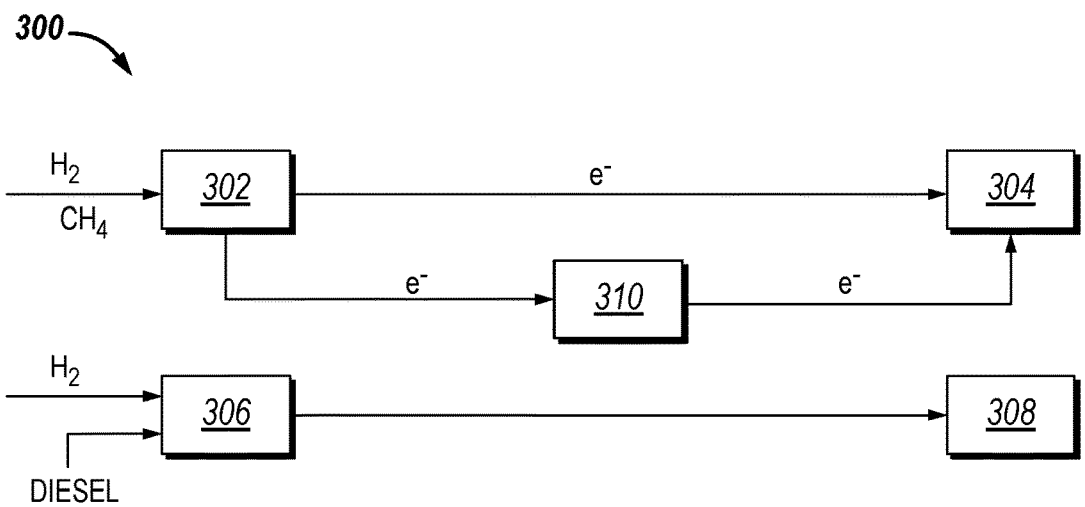
FIG. 3 is a schematic of a system 300 according to some embodiments of the present disclosure.

FIG. 3 is a schematic of a system 300 that includes two or more power systems that use hydrogen according to some embodiments of the present disclosure. Hydrogen in combination with methane may be injected into solid oxide fuel cells 302 that power electric drive 304 that powers well stimulation equipment. Hydrogen may also be injected into internal combustion engine 206 that powers mechanical drive 308 that powers oilfield equipment. An additional fuel source may also be fed to the internal combustion engine 306 with the hydrogen. Examples of suitable additional fuel sources include hydrocarbon-based fuel such as diesel, methane, and natural gas, among others. In some embodiments, the additional fuel source may be combined with the hydrogen before being fed to the internal combustion engine 306, for example, in an atomizer. In some embodiments, internal combustion engine 306 may be a dual fuel engine, for example, that uses hydrogen and diesel. Internal combustion engine 306 may power a mechanical drive 308 that powers oilfield stimulation equipment.

Solid oxide fuel cells 302 may provide electricity to electric drive 304 and/or energy storage 310. Solid oxide fuel cells 302 may be stationary or mobile. Solid oxide fuel cells 302 may be arranged in a fuel cell stack that is used to generate electricity to power oilfield equipment. Oilfield equipment may include any oilfield equipment including any electric motors on pumping units and used to drive hydraulic pumps on the pumping units, thereby pumping fracturing fluid into a wellhead at a desired pressure. The hydraulic pumping units may include one or more reciprocating pumps, centrifugal pumps, vane pumps, or other types of pumps. Oilfield equipment further may include a blender unit, a gel/advanced dry polymer (ADP) handling equipment, sand handling equipment, liquid handling equipment, a control center (e.g., tech center), and others. In some embodiments, energy generated by solid oxide fuel cells 302 may be stored in energy storage 310, for example, when the demand from well stimulation equipment is lower than the amount of electricity produced by solid oxide fuel cells 302. Energy storage 310 may be any storage that can store energy including batteries and supercapacitors. When needed, electricity from energy storage 310 may be used to power electric drive 304 that drives oilfield equipment. For example, when the demand from oilfield equipment is higher than the amount of electricity produced by solid oxide fuel cells 302, electricity may be withdrawn from energy storage 310. Alternatively, energy storage 310 may be used in place of directly powering electric drive 304 with the electricity such that electricity from hydrogen fuel cells is first stored in energy storage 310 then supplied to electric drive 304.

Figure 4:
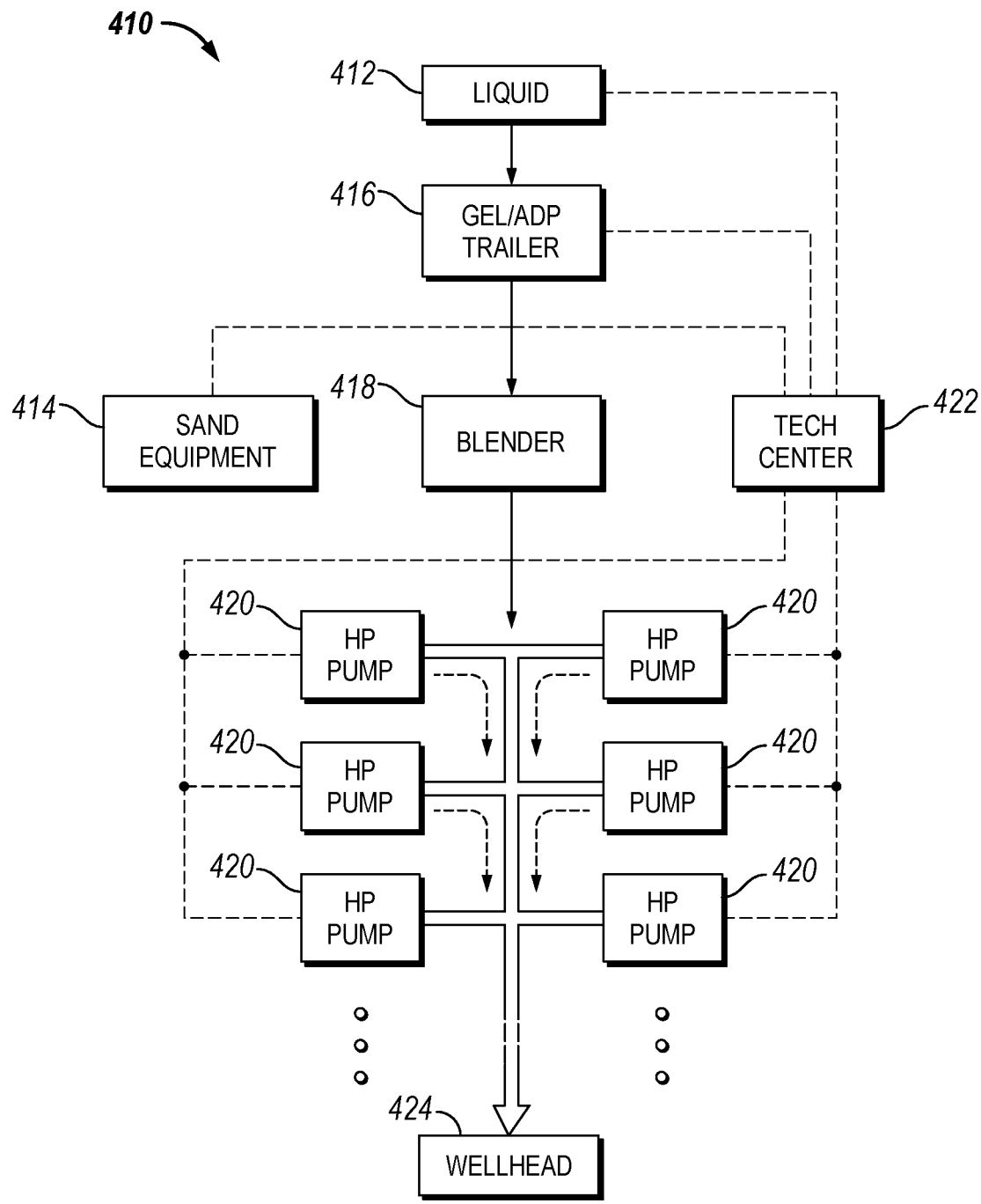
FIG. 4 is a block diagram of a well stimulation equipment spread 410 used in well stimulation treatment according to some embodiments of the present disclosure.

FIG. 4 is a block diagram of a well stimulation equipment spread 410 used in well stimulation treatment (e.g., hydraulic fracturing treatment). FIG. 4 is an example illustration of the oilfield equipment that can be used with any of the systems disclosed herein such as system 100 on FIG. 1, system 200 on FIG. 2, and system 300 on FIG. 3. The well stimulation equipment spread 410 may include liquid handling equipment 412, sand handling equipment 414, gel/advanced dry polymer (ADP) handling equipment 416, a blender unit 418, a plurality of hydraulic pumping units 420, a control center 422 (e.g., tech center), and a wellhead 424. In some embodiments, the well stimulation equipment spread 410 may not include all of the components illustrated. For example, the well stimulation equipment spread 410 may not include a gel/advanced dry polymer (ADP) handling equipment 416 when the gel/advanced dry polymer (ADP) handling equipment is not needed to create a desired treatment fluid. In some embodiments, one or more stimulation (e.g., fracturing) equipment components may be separated into two or more separate units. In still other embodiments, two or more of the illustrated equipment components may be incorporated into a single unit. It should be noted that additional equipment components not shown in FIG. 4 may be located at the well site as well, and different numbers and arrangement of the illustrated well stimulation equipment may be used.

In a general well stimulation (e.g., fracturing) operation, liquid handling equipment 412 may provide water that is entirely made up of potable water, freshwater, and/or treated water for mixing a desired treatment fluid. Other liquid may be provided from liquid handling equipment 412 as well. The water (or other liquid) may be mixed with a viscosity-increasing agent in the gel/advanced dry polymer (ADP) handling equipment 416 to provide a higher viscosity fluid to help suspend sand or other particulates. Sand handling equipment 414 may output dry bulk material such as sand, proppant, and/or other particulates into blender unit 418 at a metered rate. Blender unit 418 may mix the sand with the higher-viscosity water-based fluid in a mixing compartment to form a treatment fluid for fracturing the well. As mentioned above, similar equipment components may be utilized to mix various types of treatment fluids for use in other well stimulation applications (i.e., not limited to fracturing).

Blender unit 418 may be coupled to an array of hydraulic pumping units 420 via a manifold 426. Although only six pumping units 420 are illustrated, several more pumping units 420 may be positioned on location. Hydraulic pumping units 420 are arranged in parallel and used to deliver the treatment fluid to the wellhead 424 such that the treatment fluid is pumped into the wellbore at a desired pressure for performing the wellbore stimulation.

The control center 422 may be communicatively coupled to various sensing and/or control components on the other stimulation equipment. Control center 422 may include data acquisition components and one or more processing components used to interpret sensor feedback and monitor the operational states of the stimulation equipment located at the well site. In some embodiments, control center 422 may output control signals to one or more actuation components of the stimulation equipment to control the well stimulation operation based on the sensor feedback.

The well stimulation equipment spread 410, many of the large well stimulation equipment components (e.g., liquid handling unit 412, sand handling equipment 414, gel/advanced dry polymer (ADP) handling equipment 416, blender unit 418, hydraulic pumping units 420, and tech center 422) must be electrically powered. The power requirements for these components together may be on the order of approximately 30 Megawatts. However, the equipment may have a power requirement that is more or less than this estimated requirement. The disclosed embodiments are directed to using one or more stacks of fuel cells to generate electricity for powering the stimulation equipment present in the well stimulation equipment spread 410, instead of using internal/external combustion engines to drive a generator. One or more fuel cell units may be coupled to and used to power liquid handling equipment 412, sand handling equipment 414, gel/advanced dry polymer (ADP) handling equipment 416, blender unit 418, hydraulic pumping units 420, tech center 422, or a combination thereof, or any other electrically powered equipment on location.

Figure 5:
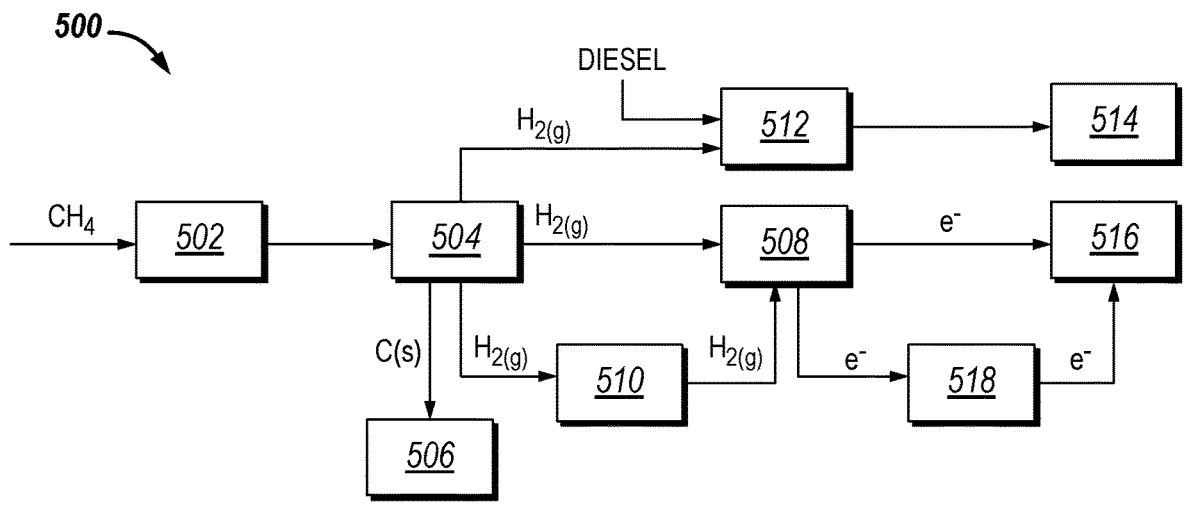
FIG. 5 is a schematic of a system 500 according to some embodiments of the present disclosure.

FIG. 5 is a schematic of a system 500 that includes two or more power generation systems using hydrogen according to some embodiments of the present disclosure. Methane may be fed into a methane pyrolysis reactor 502, which produces solid carbon and molecular hydrogen gas. The product stream including the produced solid carbon and molecular hydrogen gas may be fed into a separation unit 504. Separation unit 504 may be configured to separate the product stream into a gas stream containing the molecular hydrogen gas ($H_{2(g)}$) and other gasses present in the product stream, and a solid product containing the solid carbon ($C_{(s)}$). The solid carbon ($C_{(s)}$) may be sent to a solid carbon storage 506. The molecular hydrogen gas ($H_{2(g)}$) may be separated from the rest of the gas stream (not shown) and then sent to a hydrogen fuel cell 508, a hydrogen storage 510, and an internal combustion engine 512. Hydrogen storage 510 may include any storage capable of handling hydrogen including metal hydride in a container, a completed well dedicated to hydrogen storage, and any combination thereof. The molecular hydrogen gas stored in hydrogen storage 510 may be fed to a hydrogen fuel cell 508 when electricity is needed. The molecular hydrogen gas stored in hydrogen storage 510 may need to be purified before being fed into hydrogen fuel cell 508 by a purification unit (not shown). Hydrogen fuel cell 508 may produce electricity that powers electrical drive 516 that powers well stimulation equipment. Hydrogen fuel cells 508 may provide electricity to recharge energy storage 518 when the demand from well stimulation equipment is lower than the amount of electricity produced by hydrogen fuel cells 508. When the demand from well stimulation equipment is higher than the amount of electricity produced by hydrogen fuel cell 508, electricity will be withdrawn from energy storage 518. Hydrogen in combination with diesel is injected into internal combustion engine 512 that powers mechanical drive 514 that powers well stimulation equipment.

Figure 6:
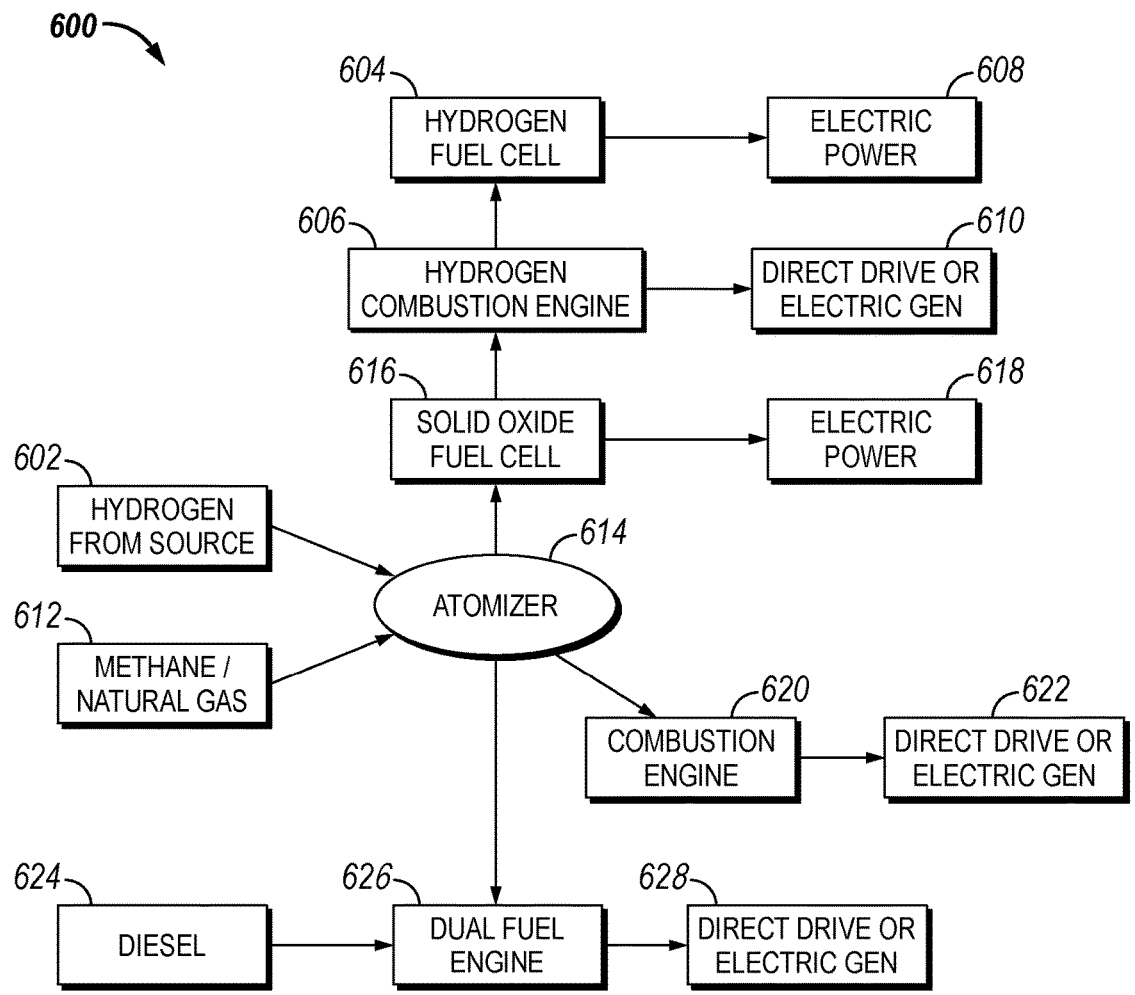
FIG. 6 is a schematic of a system 600 according to some embodiments of the present disclosure.

FIG. 6 is a schematic of a system 600 according to some embodiments of the present disclosure. System 600 illustrates how multiple power systems can power well stimulation equipment from one or more type of fuels including hydrogen and hydrocarbon-based fuel such as methane, natural gas, and diesel. As illustrated, molecular hydrogen gas 602 may be fed into a hydrogen fuel cell 604 and into a hydrogen combustion engine 606. Molecular hydrogen gas 602 may come from any source including a methane pyrolysis reactor, an electrolyser (which uses electricity from renewable energy, for example, to split water into molecular hydrogen gas and oxygen), and any hydrogen storage (not shown). Hydrogen storage (not shown) includes any storage capable of handling hydrogen including metal hydride in a container, a completed well dedicated to hydrogen storage, and any combination thereof. Hydrogen fuel cell 604 may produce electricity that powers electrical drive 608 that powers well stimulation equipment (not shown). Molecular hydrogen gas 602 may also fed into hydrogen combustion engine 606 that powers a direct drive 610 that powers well stimulation equipment (not shown) or an electric generator 610 that powers an electric drive that powers well stimulation equipment (not shown).

Molecular hydrogen gas 602 along with methane or natural gas 612 may be fed into atomizer 614 to fuel a solid oxide fuel cell 616 that produces electricity to power an electric drive 618 that powers well stimulation equipment (not shown). Atomizer 614 may also fuel an internal combustion engine 620 that powers a direct drive 622 that powers well stimulation equipment (not shown) or an electric generator 622 that powers an electric drive that powers well stimulation equipment (not shown). Atomizer 614 along with diesel 624 may also fuel a dual fuel engine 626 that powers a direct drive 628 that powers well stimulation equipment (not shown) or an electric generator 628 that powers an electric drive that powers well stimulation equipment (not shown).

Statement 1. A system comprising: at least two different power generation systems using at least hydrogen as a source of energy; and well stimulation equipment coupled to the at least two different power generation systems.

Statement 2. The method of statement 1, further comprising a methane pyrolysis reactor for generating hydrogen from methane.

Statement 3. The method of statement 1 or statement 2, further comprising a microwave methane pyrolysis reactor for generating hydrogen from methane.

Statement 4. The method of any of statements 1-3, further comprising an energy storage system electrically coupled to at least one of the two different power generation systems and the well stimulation equipment, wherein the energy storage system is configured to store electricity generated by the at least one of the two different power generation systems.

Statement 5. The method of any of statements 1-4, wherein the at least two different power generation systems comprise a fuel cell.

Statement 6. The method of any of statements 1-5, wherein the fuel cell comprises a hydrogen fuel cell.

Statement 7. The method of any of statements 1-6, wherein the fuel cell comprises a solid oxide fuel cell.

Statement 8. The method of any of statements 1-7, wherein the fuel cell is electrically coupled to an energy storage system, wherein the energy storage system is electrically coupled to the well stimulation equipment, wherein the energy storage system is configured to store electricity generated by the fuel cell.

Statement 9. The method of any of statements 1-8, wherein the at least two different power generation systems comprise a hydrogen fuel cell and an internal combustion engine.

Statement 10. The method of any of statements 1-9, wherein the at least two different power generation systems comprise a solid oxide fuel cell and an internal combustion engine.

Statement 11. The method of any of statements 1-10, wherein the at least two different power generation systems are at least one fuel cell, an internal combustion engine, and an electric generator.

Statement 12. The method of any of statements 1-11, wherein the well stimulation equipment comprises a pumping unit.

Statement 13. The method of any of statements 1-12: wherein the well stimulation equipment comprises at least one fracturing equipment selected from the group of fracturing equipment consisting of a gel mixer, a liquid handling equipment, a sand handling equipment, a blender, and a high-pressure hydraulic pumping unit.

Statement 14. The method of any of statements 1-13, wherein at least one of the at least two different power generation systems comprises an internal combustion engine powering an electric generator powering well stimulation equipment.

Statement 15. A method comprising: converting hydrogen to power in two or more power generation systems; and performing a well stimulation operation at a well site using at least a portion of the power from the two or more power generation systems.

Statement 16. The method of statement 15, wherein the two or more power generation systems comprises at least one power generation system selected from the group consisting of a fuel cell, a solid oxide fuel cell, an internal combustion engine, an energy storage system, and any combination thereof.

Statement 17. The method of statement 15 or statement 16, further generating hydrogen from a methane pyrolysis reactor.

Statement 18. The method of any of statements 15-17, further generating hydrogen from a microwave methane pyrolysis reactor.

Statement 19. The method of any of statements 15-18, further charging an energy storage system using electricity generated by the two or more power generation systems.

Statement 20. The method of any of statements 15-19, further charging an energy storage system using electricity from a grid.

It should be understood that the compositions and methods are described in terms of "comprising," "containing," or "including" various components or steps, the compositions and methods can also "consist essentially of" or "consist of" the various components and steps. Moreover, the indefinite articles "a" or "an," as used in the claims, are defined herein to mean one or more than one of the elements that it introduces.

For the sake of brevity, only certain ranges are explicitly disclosed herein. However, ranges from any lower limit may be combined with any upper limit to recite a range not explicitly recited, as well as, ranges from any lower limit may be combined with any other lower limit to recite a range not explicitly recited, in the same way, ranges from any upper limit may be combined with any other upper limit to recite a range not explicitly recited. Additionally, whenever a numerical range with a lower limit and an upper limit is disclosed, any number and any included range falling within the range are specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values even if not explicitly recited. Thus, every point or individual value may serve as its own lower or upper limit combined with any other point or individual value or any other lower or upper limit, to recite a range not explicitly recited.

Therefore, the present disclosure is well adapted to attain the ends and advantages mentioned as well as those that are inherent therein. The particular examples disclosed above are illustrative only, as the present disclosure may be modified and practiced in different but equivalent manners apparent to those skilled in the art having the benefit of the teachings herein. Although individual examples are discussed, the disclosure covers all combinations of all those examples. Furthermore, no limitations are intended to the details of construction or design herein shown, other than as described in the claims below. Also, the terms in the claims have their plain, ordinary meaning unless otherwise explicitly and clearly defined by the patentee. It is therefore evident that the particular illustrative examples disclosed above may be altered or modified and all such variations are considered within the scope and spirit of the present disclosure. If there is any conflict in the usages of a word or term in this specification and one or more patent(s) or other documents that may be incorporated herein by reference, the definitions that are consistent with this specification should be adopted.

What is claimed is:

1. A system comprising:
    a microwave methane pyrolysis reactor for generating hydrogen from methane at a wellsite;
    at least two different power generation systems using the generated hydrogen as a source of energy at the same wellsite; and
    well stimulation equipment coupled to the at least two different power generation systems.

\* \* \* \* \*